United States Patent [19]

Gruodis et al.

[11] 3,913,730

[45] Oct. 21, 1975

[54] ARTICLE TRANSFERRING APPARATUS

[75] Inventors: Romualdas K. Gruodis, Mount Airy; Bernard C. Botula, Gaithersburg; Wojslaw J. Milan-Kamski, Germantown, all of Md.

[73] Assignee: Fairchild Industries, Inc., Germantown, Md.

[22] Filed: Mar. 8, 1974

[21] Appl. No.: 449,508

[52] U.S. Cl. .................. 198/205; 193/2 R; 198/26; 198/38; 198/45; 198/185
[51] Int. Cl.² ..................................... B65G 15/60
[58] Field of Search ............ 198/26, 38, 42, 45, 65, 198/66, 68, 185, 205; 214/11 R

[56] References Cited
UNITED STATES PATENTS

| | | | |
|---|---|---|---|
| 1,125,237 | 1/1915 | Whittier | 198/45 |
| 3,166,181 | 1/1965 | Rutkus et al. | 198/185 |
| 3,198,308 | 8/1965 | Driesch et al. | 198/38 |
| 3,286,811 | 11/1966 | McWilliams | 198/38 |
| 3,330,401 | 7/1967 | Ahlstedt | 198/26 |
| 3,411,622 | 11/1968 | Dickie | 214/11 |

*Primary Examiner*—James B. Marbert
*Assistant Examiner*—Jeffrey V. Nase
*Attorney, Agent, or Firm*—Michael W. York

[57] ABSTRACT

An article transferring apparatus including a canted overhead conveyor for transporting articles, a fence located adjacent to the lower edge of the overhead conveyor for keeping the articles from coming off of the conveyor, a gate forming part of the fence for permitting articles to come off of the conveyor, and gate operating apparatus for operating the gate. A lower conveyor for transporting article is located below the overhead conveyor and a chute extends from the gate in the fence associated with the overhead conveyor to the lower conveyor to permit articles to pass from the overhead conveyor to the lower conveyor when the gate is open. The chute itself has three regions which enable it to efficiently transfer articles without tending to damage the articles.

3 Claims, 5 Drawing Figures

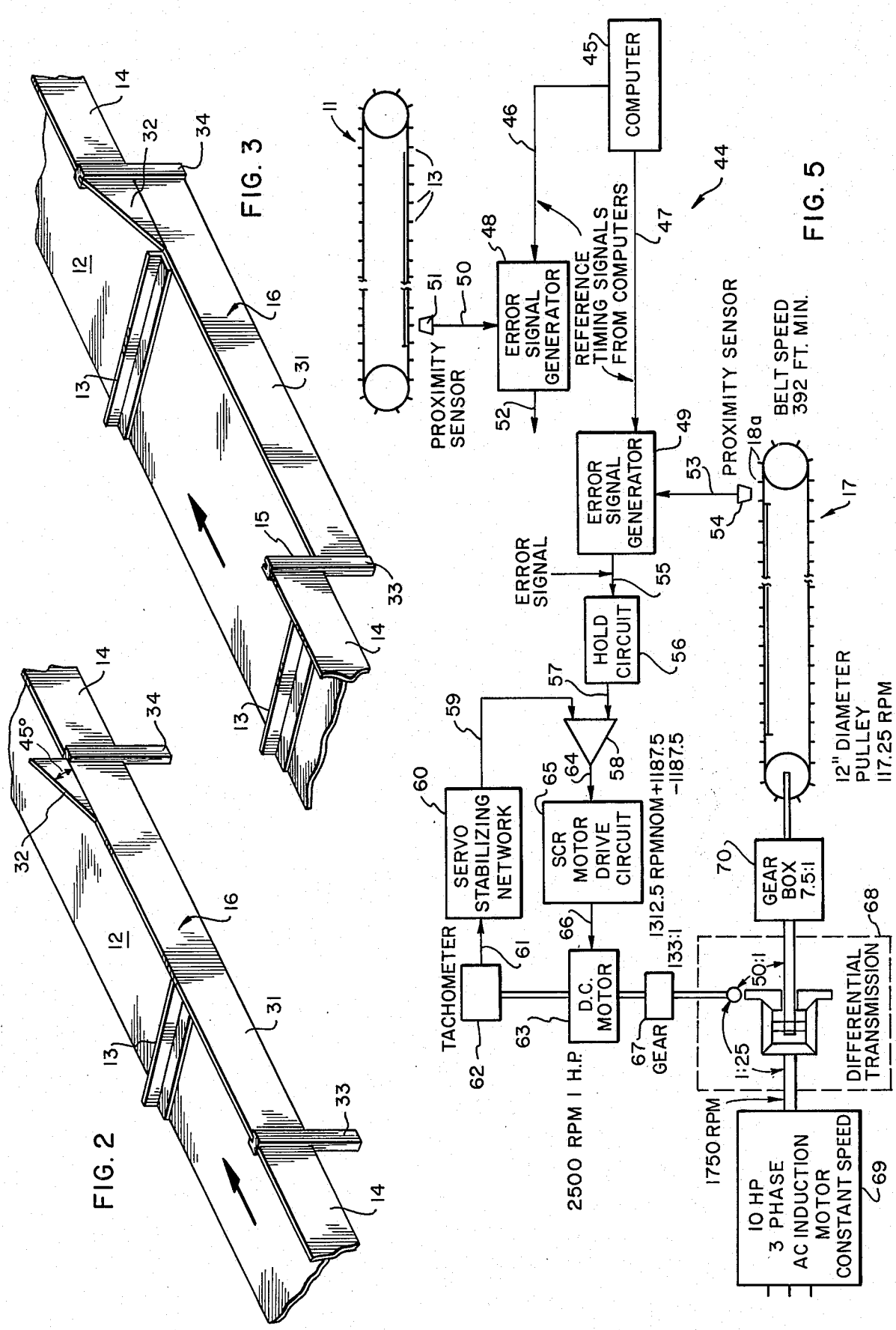

ARTICLE TRANSFERRING APPARATUS

BACKGROUND OF THE INVENTION

Moving conveyors are used in many instances to transfer articles from one location to another and they have proven themselves to be highly efficient means for transferring articles. In view of their utility conveyors have found widespread use in factories, warehouses and in postal operations. In many instances, it is desired to transfer articles located on one moving conveyor to another moving conveyor. Of course, both conveyors could be stopped and then the article could be moved from the first conveyor to a position on the second conveyor. However, this is a very inefficient manner to transfer an article from one moving conveyor to another and it is highly desirable that both conveyors continue to move during the transfer operation.

A number of article transferring systems have been proposed in the past for transferring articles from one moving conveyor and the like to another moving conveyor. For instance, a number of article transferring systems have been proposed in the past for transmitting an article from an overhead conveyor or the like to a conveyor that is located underneath the overhead conveyor. Typical systems of this type are disclosed in U.S. Pat. Nos. 3,151,731 and 3,339,699. Unfortunately, these systems require the installation of rather expensive and complex equipment. This type of system is also not generally suitable for high speed operation since damage is likely to occur to the articles at high conveyor speeds.

Another type of prior art transferring system is disclosed in U.S. Pat. No. 3,140,771. The apparatus disclosed in this patent utilizes a moving deflector to diagonally transfer an article from one conveyor or the like to another adjacently located conveyor. Another article transferring system disclosed in U.S. Pat. No. 3,693,776. The type of system disclosed in this patent is capable of being used to push articles onto a moving conveyor or the like through the use of an overhead conveyor system with downward extending paddles which are connected to a track that extends diagonally with respect to the direction of travel of the conveyor so that the paddles push articles onto the conveyor in a diagonal direction. Although this type of system is generally suitable for loading articles onto a moving conveyor from a stationary platform, it would not be entirely satisfactory for attempting to load articles on a moving conveyor from another adjacently located conveyor, particularly at high conveyor speeds. Furthermore, this type of system uses an overhead conveyor system and associated paddles which present moving machinery which may cause injury. The system is also noisy and is susceptible to jamming.

All of these prior art systems require complex and expensive machinery and are not entirely satisfactory for use in transferring an article from one moving conveyor to another moving conveyor. From the standpoint of efficiency and economy it is also desired that transfer of an article from only one moving conveyor to another moving conveyor be carried out by some passive device that will be more dependable and would be less costly and complex than the prior art systems. Passive devices such as slides and the like have been known for some time. Slides, of course, are satisfactory for transferring an article from one fixed location to another fixed location and also in some cases with suitable articles, slides may be used to transfer an article from a moving location such as on a conveyor belt to a fixed location. This is particularly true when conveyor speeds are relatively low. However, in the past successful transfer of an article from one moving conveyor to another moving conveyor has not been accomplished through the use of a slide.

In some instances, such as in postal type operations, it is desired to transfer an article from one moving conveyor to a particular location on another moving conveyor. In such a system timing is extremely important since if the transfer time of the article is not precise, the article will not end up at the desired location on the moving conveyor. As previously indicated, a passive transfer device such as a slide would be desirable since it is less complex and less expensive than other types of transfer devices. However, it would appear that such a passive device would be inappropriate for transferring articles of different sizes and/or weights between a moving conveyor and particular locations on a second moving conveyor since it is well known that different size articles have different transfer times on a given slide in view of variable forces associated with friction and other known factors associated with the sliding of articles of different sizes and/or weights.

The apparatus of the present invention overcomes these deficiencies associated with prior art devices and systems and permits an article to be readily transferred from one moving conveyor to another moving conveyor through the use of a passive device without the necessity for any complex or expensive equipment. Moreover, the present invention can be used to transfer articles of different sizes and/or weights from one moving conveyor to particular locations on another moving conveyor.

BRIEF DESCRIPTION OF THE INVENTION

This invention relates to article transferring apparatus for transferring articles such as packages and the like and more particularly to article transferring apparatus which permits the transfer articles without damage to the articles.

It is accordingly an object of the present invention to provide an article transferring apparatus which can be used with at least two moving conveyors.

It is an object of the present invention to provide an article transferring apparatus which is capable of efficiently transferring an article from one moving conveyor to a second moving conveyor.

It is also an object of the present invention to provide an article transferring apparatus which permits the transferring articles from one moving conveyor to another moving conveyor through the use of a passive device.

It is also an object of the present invention to provide an article transferring apparatus that is dependable in its operation.

It is also an object of the present invention to provide an article transferring apparatus which permits the transferring articles from one conveyor to a second conveyor without requiring the stopping of either of the conveyors during the transfer operation.

It is a further object of the present invention to provide an article transferring apparatus for transferring articles from one moving conveyor to a second moving conveyor that reduces the possibility of damage to the articles in the transfer operation.

It is also an object of the present invention to provide an article transferring apparatus that prevents jamming of the article as the article is leaving a moving conveyor.

It is also an object of the present invention to provide an article transferrring apparatus that is particularly suited for use in postal type operations.

It is a further object of the present invention to provide an article transferring apparatus for transferring articles from one moving conveyor to a second moving conveyor that permits an article to be transferred from the first moving conveyor to a generally precise location on the second moving conveyor.

The present invention provides an article transferring apparatus including a canted conveyor for transporting articles, conveyor retaining means located adjacent to the lower edge of the conveyor for keeping articles from coming off of the conveyor, gate means with a projection forming part of the conveyor retaining means for permitting articles to come off of the conveyor and, means operatively connected to the gate means for operating the gate means.

BRIEF DESCRIPTION OF THE DRAWINGS

The invention will be hereinafter more fully described with reference to the accompanying drawings in which:

FIG. 2 is an enlarged perspective view of a portion of the structure illustrated in FIG. 1 illustrating a transfer gate which forms part of the present invention in its closed position;

FIG. 3 is a perspective view of the structure illustrated in FIG. 2 illustrating the transfer gate in its open position;

FIG. 5 is a schematic view of the synchronizing system that forms part of the present invention.

DETAILED DESCRIPTION OF THE PREFERRED EMBODIMENT

Figure 1:
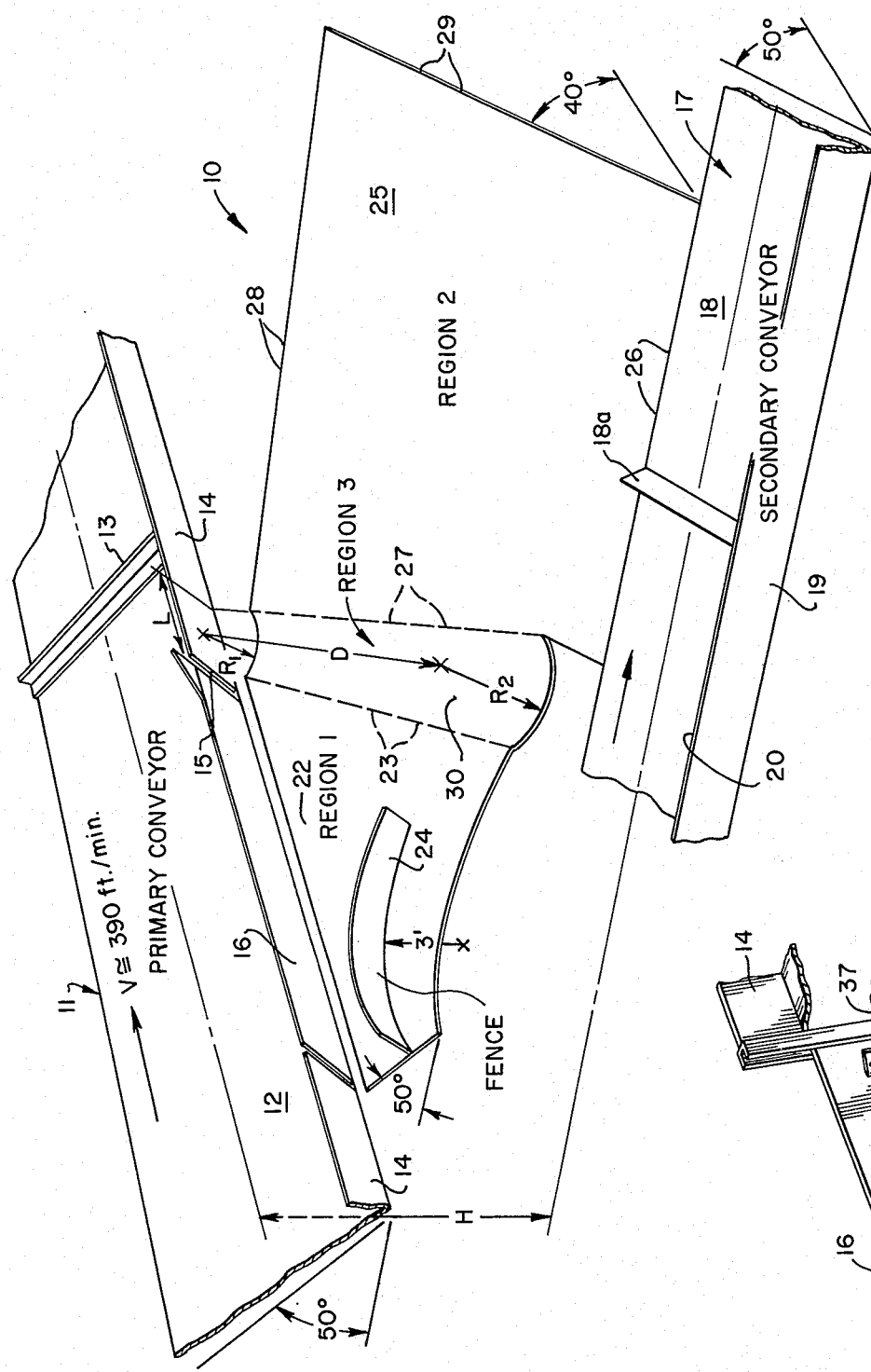
FIG. 1 is a perspective view of the article transferring apparatus for the present invention.

Referring first to FIG. 1 the apparatus for transferring articles from the present invention is illustrated and is generally designated by the number 10. The apparatus for transferring articles 10 comprises a tipped or canted conveyor 11 with a conveyor belt 12 as indicated in the upper surface of the conveyor belt 12 is canted at an angle of substantially 50° with the horizontal. It should also be noted that a series of spaced cleats 13 project upwardly from the upper surface of the conveyor belt 12 at substantially equal intervals of 6 feet in the preferred embodiment. In the preferred embodiment, it should also be noted that the conveyor belt 12 is travelling in the direction indicated by the arrow at approximately a velocity of 390 feet per minute. Retaining means comprising a fence 14 is located adjacent to the lower edge of the overhead conveyor 11. The fence 14 has an elongated aperture 15 approximately 6 feet long in the preferred embodiment located in it to permit passage of articles through the fence. However, a transfer gate 16 normally blocks this aperture and prevents passage of any articles from the conveyor.

A second canted conveyor 17 is located below the conveyor 11 and this conveyor 17 has a moving conveyor belt 18 with equally spaced upward extending cleats 18a. As illustrated, the upper surface of the conveyor belt 18 is at an angle which is substantially 50° with the horizontal. A back stop 19 is located along the adjacent lower edge of the conveyor 17 and this back stop has an inner surface covered with a shock absorbing material 20 that prevents damage to the articles being transferred when they strike the back stop. A transfer chute is generally designated by the number 22 and extends from a location adjacent opening 15 in the fence 14 located near the the overhead conveyor 11 to the upper edge of the lower conveyor 17. As illustrated, the transfer chute 21 has three separate regions which are designated as Region 1, Region 2 and Region 3. Region 1, which is designated by the number 22, has its upper edge located immediately adjacent to the opening 15 and the transfer gate 16 and has an essentially flat upper surface which is located substantially at an angle of 50° with the horizontal plane. An upward extending curved fence 24 is located on the upper surface of Region 1 near the forward edge of the opening 15. This fence 24 serves to guide small articles that are being transferred as they pass the opening 15 and it prevents the articles from falling off the forward edge of Region 1. In the preferred embodiment, the fence 24 comprises a curved plate shaped to substantially correspond to form one-eighth to one-fourth of a circle having approximately a 3 foot radius.

As illustrated in FIG. 1, Region 2 or the region designated by the number 25 comprises a substantially flat sheet whose upper surface is canted in an upward direction at substantially an angle of 40° with respect to the horizontal plane. The lower edge 26 of the Region 2 lies substantially adjacent to the upper edge of the conveyor 17 so that articles can readily slide off of the lower edge of Region 3 and onto the upper surface of the conveyor belt 18. The upper surface of the conveyor belt 18 forms substantially an angle of 50° with the horizontal plane. Region 2 or the region designated by the number 25 has a diagonal edge 27 that extends upward toward the upper conveyor 11. As illustrated an upper extension of the edge 27 will intersect the fence 14 at a point a distance L substantially 18 inches rearward of the trailing edge of the opening 15. It should also be noted that the upper edge 28 of Region 2 or the region designated by the number 25 lies at substantially the same height as the lower edge of the fence 14. Region 2 has an outer edge 29 that forms a substantially right angle with the upper edge 28.

Region 3 or the region designated by the number 30 is a curved transistion region which interconnects both the lower edge 23 of Region 1 and the inner edge 27 of Region 2. This region is important because the articles being transferred have to change their course substantially as they slide over this region. Region 3 is shaped to correspond to substantially a section of the surface of a cone and in a preferred embodiment the upper surface of the cone has a radius of curvature $R_1$ as illustrated which would be substantially equal to 18 inches and it would have a lower radius of curvature $R_2$ equal to substantially 3 feet. The distance D between the respective centers for $R_1$ and $R_2$ is substantially 38 inches.

From FIG. 1 it is apparent that if an article is travelling on the conveyor belt 12 when the gate 16 is open, gravity will cause the article to pass through the opening 15 in the fence 14. The article then may or may not strike the deflector fence 24 but in any event it will pass through Region 1 into Region 3 and then reverse or change its course in Region 3 and then pass through Region 2. The article then slides down Region 2 and ends up on the conveyor belt 18 where it is transported in the direction indicated by the arrow.

The details of the gate 16, the fence 14 and the opening 15 are best illustrated in FIGS. 2 and 3. The transfer gate 16 comprises a generally thin rectangular shaped gate body member 31 and a flat triangular shaped wedge member 32 that is rigidly attached to the aft upper edge of the gate body member 31. The triangular shaped wedge member 32 is preferably manufactured from a suitable plastic and is shaped to form a right triangle whose forward apex form substantially a 45° angle. The forward edge of the gate body member 31 faces in a direction against the direction of motion of the conveyor 11 and it rides up and down in a forward gate support member 33. In a similar manner the aft or opposite edge of the gate body portion 31 and the aft edge of the associated triangular edge 32 both ride up and down the aft gate support member 34. Consequently, the entire transfer gate 16 can be moved to the closed position indicated in FIG. 2 or to the open position illustrated in FIG. 3 when it is desired to have an article slide off of the canted conveyor belt 12.

The purpose of the wedge 32 which is located in the rearward upper portion of the gate body member number 31 is best illustrated by reference to FIG. 3. If the gate 16 did not have a triangular shaped wedge 32 an article that was located only half way off of the belt 12 might strike up against the rearward gate support 34 and be jammed between that support and one of the cleats 13. This could result in severe damage to the article and to the article transferring apparatus itself. However, since the wedge 32 is present the forward slopping edge 35 causes the article to move upward and not be jammed between the support 34 and a cleat 13. In most cases an article will just tumble onto Region 1 of the transfer chute 21.

Figure 4:
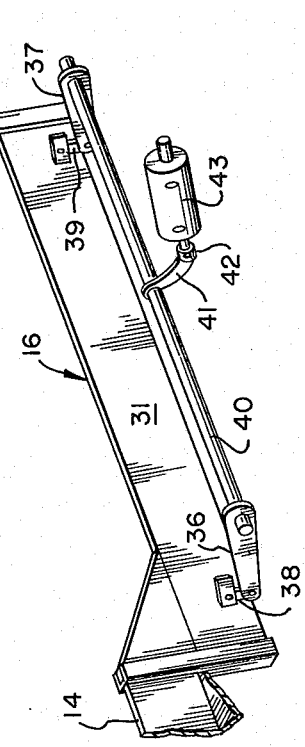
FIG. 4 is an enlarged perspective view of a portion of the structure illustrated in FIG. 1 illustrating the transfer gate and portions of the apparatus used to operate the gate.

FIG. 4 illustrates the apparatus used to operate the gate 16. As illustrated, two arm members designated by the numbers 36 and 37 have their outer ends rotatably connected to the respective connecting members 38 and 39 which are rotatably connected to the lower portion of the gate body member 31 by pin joints. The inner ends of the arm members 36 and 37 are rigidly connected to the ends of a tubular support member 40 that is rotatably supported by suitable means which have been omitted for clarity. A crank member 41 is also provided and has one of its ends rigidly connected to its tubular support member 40 and the other end is rotatably connected to an actuating member 42 a pneumatic actuating cylinder 43. The pneumatic cylinder 43 would in turn of course be connected to suitable pneumatic lines and a source of compressed air which have not been illustrated since they are known in the art.

The synchronizing system 44 that forms part of the invention is illustrated in FIG. 5 and it includes a computer 45 which sends out reference timing signals on leads 46 and 47 to respective error signal generators 48 and 49. The error signal generator 48 receives signals on lead 50 from a proximity sensor 51 that detects cleats 13 on the primary conveyor 11 as they pass by the detector. The error signal generator 48 compares the signals received on the lead 50 with signals received on lead 46 from the computer and if there is a difference in frequency of the signals an approximate error signal is generated and sent out on lead 52.

In a similar manner the error signal generator 49 receives signals on lead 53 from a proximity sensor 54 that detects the passage of cleats 18a on the secondary conveyor 17. The signal generator 49 compares the frequency of the signals received on lead 53 with the frequency of the signals received on lead 47 and in appropriate cases sends an error signal out on lead 55 to hold circuit 56 which is used to ensure a stable error signal level during the time intervals between error sampling times.

The hold circuit in turn provides an output signal on lead 57 to an operational amplifier summing network 58. The operational amplifier summing network 58 receives a signal on lead 59 from a servo stabilizing network 60 that is in turn represents the output received on lead 61 from a tachometer 62 which is connected to the D. C. motor 63. The operational amplifier summing network 58 subtracts the signal it receives on the lead 59 from the error signal it receives on lead 57 and provides a resulting signal on the lead 64 to a silicon controlled rectifier drive circuit 65 which provides a signal on the lead 66 that controls the speed of the D. C. motor 63.

The output of the D. C. motor 63 is connected to a gear 67 which is in turn connected to a differential transmission 68. An A. C. constant speed induction motor 69 provides the input to the differential transmission 68 and the output of the differential transmission is coupled to a gear box 70 whose output is connected to and drives the secondary conveyor 17. Since the output of the D. C. motor 63 is connected through the gear 67 to the differential transmission 68 and since the speed of the D. C. motor is controlled by the error signal from the error signal generator 49, the error signal results in an appropriate change in the gear ratio in the differential transmission 68 which in turn either results in a speed up or slowing down of the moving secondary conveyor 17.

The part of the synchronizing system 44 that is connected to the lead 52 and is associated with the primary conveyor 11 is identical to that illustrated for the secondary conveyor 17 and consequently it has been omitted from FIG. 5 for clarity.

Inasmuch as the various components of the synchronizing system 44 are well known in the art, they have not been discussed in detail. It will also be apparent that synchronizing system 44 could be replaced in total or part by suitable conveyor synchronizing systems available from the Dynamic Division of Eaton Yale & Towne, Inc. of Kenosha, Wisconsin, Electric Machinery Mfg. Company of Minneapolis, Minnesota and The Louis Allis Co. of Milwaukee, Wisconsin.

In order to utilize the article transferring apparatus 10, the conveyor belts 12 and 18 are caused to be moved in the respective directions indicated by the arrows and the belts are maintained in synchronization by the synchronizing system 44. Packages or other articles which are to be transferred are placed by suitable means known in the art on the upper surface of the conveyor belt 12 at a location on the belt which is forward of the gate 16. The moving canted belt 12 and the associated cleats 13 then move the articles to be transferred into the vicinity of the gate 16 which should be in its closed or upward position as illustrated in FIGS. 1 and 2 to prevent any articles from moving off of the conveyor.

When the articles which are to be transferred to the lower conveyor 17 are located adjacent to or near the gate 16, the pneumatic cylinder 43 is actuated and this causes the gate to open and the articles to pass onto Region 1 of the transfer chute 21 and then the articles pass to Regions 3 and 2 and then onto the secondary or lower conveyor belt 18 where they are caused to be moved in the direction indicated by the arrow in FIG. 1.

In normal practice, several primary conveyors 11 each having several transfer gates 16 and transfer chutes 21 could be used with a number of secondary or lower conveyors 17. This arrangement would permit a number of articles on the primary conveyors 11 to be seelctively transferred to precise locations on different secondary conveyors 17 by the selective actuation of the proper gate at a time when the appropriate articles were located at or were approaching the proper gate. In this manner, a very large quantity can be sorted through the multiple parallel paths provided by the primary conveyors 11 and secondary conveyors 17 by virtue of the conveyor synchronizing means 44 and the previously described transfer gate means 16.

An article transferring apparatus as previously was constructed to handle parcels and the like which are common in postal operations. In this apparatus the distance D was 38 inches, the width of the Region 2 was approximately 54 inches and the height H of the centerline of the overhead or primary conveyor belt 12 was approximately 60 inches above the centerline of the lower or secondary conveyor belt 18. A back stop 19 which had a height of approximately 18 inches above the upper surface of the belt 18 was also used in that specific embodiment of the invention and both conveyors 11 and 17 had widths of substantially 24 inches. All of the other parameters had their previously described values. The apparatus which was constructed permitted postal size articles to be rapidly transferred without damaging the articles.

Although the invention has been described in considerable detail with reference to a preferred embodiment, it will be understood and appreciated that variations may be made within the spirit and scope of the invention as defined in the appended claims.

What is claimed is:

1. Apparatus comprising a canted conveyor having a lower edge portion, article retaining means located adjacent to the lower edge portion of said canted conveyor, gate means for permitting articles to move off of said conveyor, said gate means having a forward portion facing in a direction against the direction of motion of said conveyor and an aft portion located at the opposite end thereof, said article retaining means having means for slidably receiving said gate means and said gate means being slidable therein, said gate means having a projection extending upward from the upper aft portion thereof for diverting articles upward which come in contact with said projection when said gate means is in an open position, and means for actuating said gate means.

2. The apparatus of claim 1, wherein said projection is substantially triangular shaped.

3. The apparatus of claim 2, wherein said projection comprises a plastic material.

* * * * *